Aug. 9, 1960   E. COOKSON   2,948,357
HYDRAULIC SHOCK ABSORBER
Filed Feb. 5, 1957
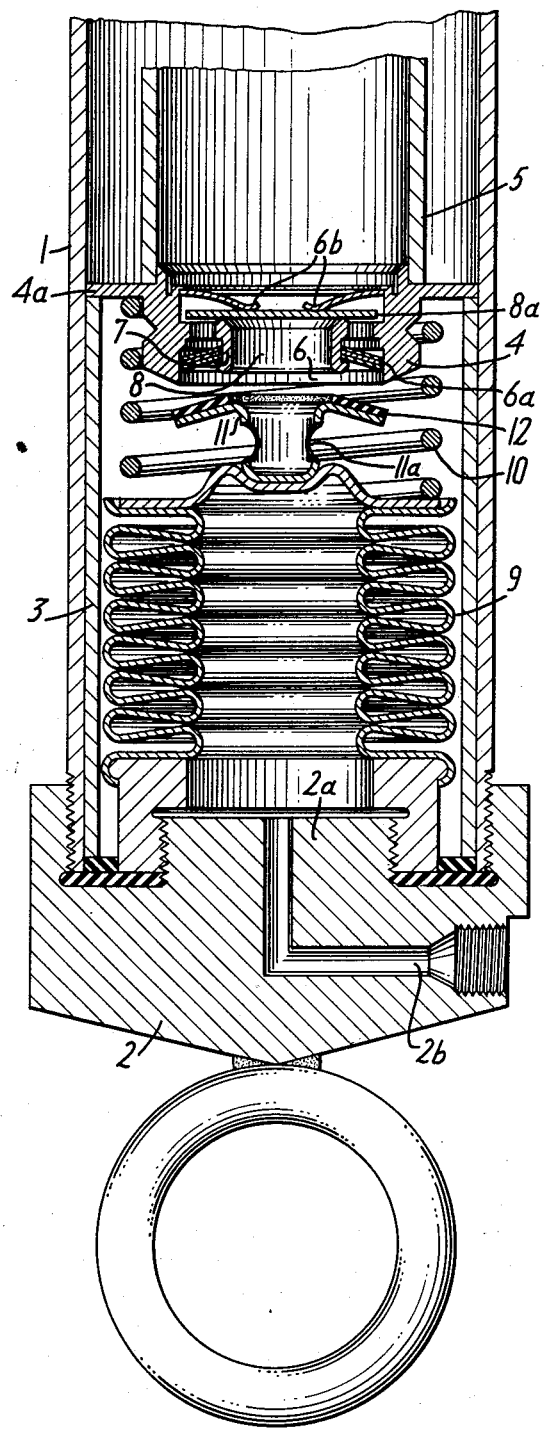

યState Patent Office

2,948,357
HYDRAULIC SHOCK ABSORBER
Eric Cookson, 14 Wilkinson Ave., Blackpool, England
Filed Feb. 5, 1957, Ser. No. 638,377
1 Claim. (Cl. 188—87)

This invention relates to hydraulic dampers or shock absorbers and more especially to hydraulic shock absorbers of the telescopic type in which fluid is adapted to be expelled by a piston into a reservoir tube.

In general these are set in manufacture to particular compression-resistance characteristics of the shock-absorber.

It is an object of the present invention to make the compression-resistance characteristics variable in use.

The invention consists of a telescopic hydraulic shock absorber of the type described having a compression-resistance valve and an hydraulically controlled valve adapted to close the compression-resistance valve outlet.

Conveniently the hydraulically controlled valve is located in an extension of the lower part of the reserve tube of the shock absorber, the compression-resistance valve outlet being at the base of the pressure tube of the shock absorber.

The hydraulic controlled valve will be closed by a fixed or variable hydraulic pressure, applied under automatic or manual control, or from a pump supply.

The invention will be further described with reference to the embodiment shown in the accompanying drawing which is a section of the lower end of a telescopic hydraulic shock absorber incorporating the invention.

The usual reserve tube 1 of the shock absorber is extended at the bottom and screws into a base fitting 2 and over its extension portion is provided with a liner 3 which at its upper end supports a base 4 fitting into the end of the usual pressure tube 5 and containing a conventional compression valve assembly with a valve member 6a in an outer resistance valve passage 6 formed between the member 4 and an inner spigot ring 7, and a second valve member 8a controlling an inner recuperating or pressure intake valve passage 8 lying within the ring 7. The valve member 6a comprises a disc pressed against the upper end of the ring 7 by spring fingers 6b.

The inner end of the base fitting 2 is provided with a central, raised portion 2a externally threaded on which screws a metal or rubber bellows capsule 9.

The capsule 9 is compressed by means of a coiled spring 10 extending between the top of the capsule 9 and the underside of an outer flange 4a of the pressure tube base 4.

To the centre of the top of the capsule 9 is secured a member 11 having an upper coned ring part covered with a rubber layer 12 and which, when the bellows capsule is extended closes the passage 6.

The centre part of the member 11 is open and free passage of fluid is provided through the side wall apertures 11a.

The base 2 is provided with an inlet passage 2b which may be connected up to some form of hydraulic fluid supply.

In operation if the pressure of the fluid supply through passage 2b is increased sufficiently the resistance valve passage 6 will be closed and will not be opened again until the pressure of the hydraulic fluid within the pressure tube 5 has increased to a sufficient value to depress the member 11, against the pressure of the hydraulic fluid within the bellows capsule 9.

It will thus be seen that by varying the pressure of the hydraulic fluid in the bellows 9 it is possible to vary the compression resistance of the shock absorber. For example when a car is travelling over a rough road, it is desirable to decrease the compression resistance to provide a softer and hence smoother ride. When the car is travelling at higher speeds it is desirable to increase the compression resistance of the shock absorbers to improve the road-holding characteristics of the car. In accordance with the present invention the compression resistance of the shock absorbers is variable from the driver's seat while the car is travelling on the road.

I claim:

In a telescopic shock absorber, a reserve tube, a pressure tube connected thereto and inside said reserve tube, a chamber connected to an end of said pressure tube, a passageway between said pressure tube and chamber, a first valve member cooperating with said passageway to control flow of fluid from said pressure tube to said chamber, another valve member cooperating with said passageway to control flow of fluid through said passageway, pressure responsive means in said chamber connected to said other valve member for moving it relative to said passageway to vary the resistance to flow of fluid through said passageway and means connected to the shock absorber for supplying fluid under pressure to actuate said pressure responsive means, said latter means being responsive to said fluid pressure supply and to pressure in said chamber.

References Cited in the file of this patent
UNITED STATES PATENTS

| 2,006,789 | Chryst | July 2, 1935 |
| 2,162,292 | Armstrong | June 13, 1939 |
| 2,189,210 | Johnson | Feb. 6, 1940 |
| 2,592,656 | Catranis | Apr. 15, 1952 |

FOREIGN PATENTS

| 712,903 | Great Britain | Aug. 4, 1954 |
| 466,271 | Italy | Oct. 24, 1951 |